United States Patent
Ohtomo et al.

(10) Patent No.: US 6,791,795 B2
(45) Date of Patent: Sep. 14, 2004

(54) THIN FILM MAGNETIC HEAD HAVING INDUCTIVE WRITE PORTION FEATURES THAT PROVIDE HIGH RECORDING FIELD STRENGTH

(75) Inventors: Shigekazu Ohtomo, Sayama (JP); Moriaki Fuyama, Hitachi (JP); Nobuo Yoshida, Odawara (JP); Hiroshi Fukui, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 10/219,283

(22) Filed: Aug. 16, 2002

(65) Prior Publication Data

US 2003/0048581 A1 Mar. 13, 2003

(51) Int. Cl.[7] .............................................. G11B 5/147
(52) U.S. Cl. ....................................................... 360/126
(58) Field of Search .................................. 360/126, 317

(56) References Cited

U.S. PATENT DOCUMENTS 6,621,659 B1 * 9/2003 Shukh et al. ................ 360/126

FOREIGN PATENT DOCUMENTS

| JP | 10-269523 | 10/1998 |
|---|---|---|
| JP | 11-007609 | 1/1999 |
| JP | 2000-276707 | 10/2000 |

* cited by examiner

*Primary Examiner*—A. J. Heinz
(74) *Attorney, Agent, or Firm*—Mattingly Stanger & Malur, P.C.

(57) ABSTRACT

A lower magnetic pole front end layer is formed on a lower magnetic pole main layer, and a lower magnetic pole projection layer, a recording gap layer and an upper magnetic pole front end layer each having substantially the same planar shape are formed on a planar surface of the lower magnetic pole front end layer. Trimming of a lower electrode is not necessary, and track width accuracy can be drastically improved because a resist frame is formed on the planar surface. A length of the upper magnetic pole front end layer from an air bearing surface to a head rear direction is greater than a length of the lower magnetic pole front end layer, and the rear end portion of the lower magnetic pole front end layer substantially defines a gap depth.

11 Claims, 9 Drawing Sheets

THIN FILM MAGNETIC HEAD HAVING INDUCTIVE WRITE PORTION FEATURES THAT PROVIDE HIGH RECORDING FIELD STRENGTH

BACKGROUND OF THE INVENTION

This invention relates to a thin film magnetic head for use in a magnetic disk apparatus and to a production method of the thin film magnetic head. More particularly, the invention relates to a thin film magnetic head having a small track width suitable for high-density recording and to a production method thereof.

Development of a thin film magnetic head excellent in recording/reading characteristics has strongly been required in recent years with improvement in a recording density of magnetic disk apparatuses and with improvement in performance of recording media. Heads using an MR (magnetoresistive effect) element or a GMR (giant magnetoresistive effect) element capable of acquiring a high reading output have been used at present as reading heads. A TMR (tunnel magnetoresistive) element capable of acquiring a higher reading sensitive has also been developed. On the other hand, an inductive thin film recording head of the prior art that utilizes electromagnetic induction has been used, and a read/write type thin film magnetic head having these reading head and recording head formed integrally with each other has been used.

To improve the recording characteristics of the thin film magnetic head, a strong and sharp recording magnetic field must be generated for sufficiently recording data to a recording medium having high coercive force. However, because a track width decreases with the improvement in a track density, magnetic saturation develops at a magnetic pole front end part of the thin film magnetic head and a recording magnetic field drops. Improvement in processing accuracy of a smaller track width has also been required to cope with the improvement of the track density.

Figure 3:
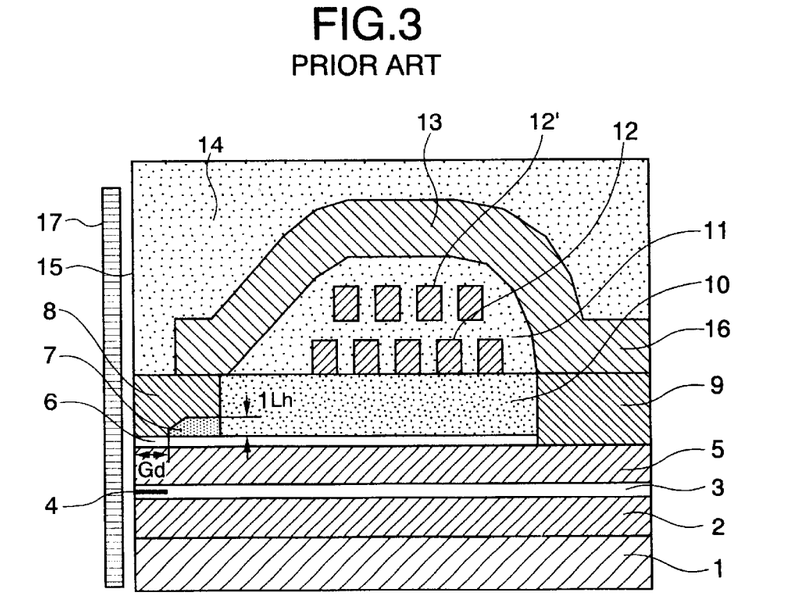
FIG. 3 to FIG. 5 are sectional views each showing a thin film magnetic head according to the prior art.

JP-A-2000-276707 proposes a method for improving processing accuracy of a small track width that separates an upper magnetic pole to an upper magnetic pole front end layer and an upper magnetic pole top layer. As shown in FIG. 3, according to this method, a lower magnetic shield 2 made of a soft magnetic material is arranged on a substrate 1 made of a non-magnetic material to improve reading resolution and to eliminate influences of an external magnetic field, a reading gap 3 made of a non-magnetic insulating material is arranged on the lower magnetic shield 2, and a reading element comprising an MR or GMR element is arranged in the reading gap 3. A lower magnetic pole 5 made of a soft magnetic material and serving also as an upper magnetic shield is disposed on the reading element 4. A depth-defining non-magnetic layer 7 for defining a gap depth is arranged on the recording gap layer 6, and an upper magnetic pole front end layer 8 and an upper magnetic pole rear end layer 9 are further disposed on the recording gap layer 6. Gaps among these layers are filled with a non-magnetic insulating layer 10 and are planarized. A coil insulating layer 11 is disposed on the surface so planarized and a lower coil 12 and an upper coil 12' are arranged inside the coil insulating layer. The coil is a single-layered coil in some cases. After an upper magnetic pole top layer 13 is disposed, the head is protected as a whole by a protective layer 14. The coils 12 and 12' are so constituted as to encompass a rear end portion 16 of the upper magnetic pole top layer. When a reading current is applied to the coils 12 and 12', a magnetic flux is induced in the upper magnetic pole top layer 13, the upper magnetic pole rear end layer 9 and the lower magnetic pole 5, and a signal is recorded to a recording medium 17 running in a spaced-apart relation by a very small distance from an air bearing surface 15 through a recording magnetic field generated from a front end of the recording gap. The magnetic flux concentrates on positions in the proximity of the recording gap from the lower magnetic pole and the upper magnetic pole front end layer. Consequently, a high recording magnetic field develops. A contact length of the upper magnetic pole front end layer 8 with the recording gap layer 6 is called a "gap depth Gd". The magnetic flux concentrates much more on the magnetic pole front end when the gap depth Gd is smaller, so that the recording magnetic field increases.

When the upper magnetic pole front end layer 8 is formed, a photo resist is applied to the depth defining non-magnetic layer 7 and to the recording gap layer 6. The photo resist is exposed and developed through a mask having a predetermined shape of the upper magnetic pole front end layer. A portion of the photo resist that is to serve as the shape of the upper magnetic pole front end layer is then removed, and a high saturation flux density material to serve as the upper magnetic pole front end layer is formed at the removed portion in accordance with a plating method. In the thin film magnetic head according to the prior art, the photo resist for forming the upper magnetic pole front end layer 8 is formed on the slope of the depth defining non-magnetic layer 7. Therefore, when the photo resist is exposed, the shape of the upper magnetic pole front end layer cannot be formed with high accuracy due to reflection of light from the slope of the depth defining non-magnetic layer and due to insufficiency of the depth of focus. This problem becomes particularly serious when a narrow track width of the upper magnetic pole front end layer is formed.

Figure 4:
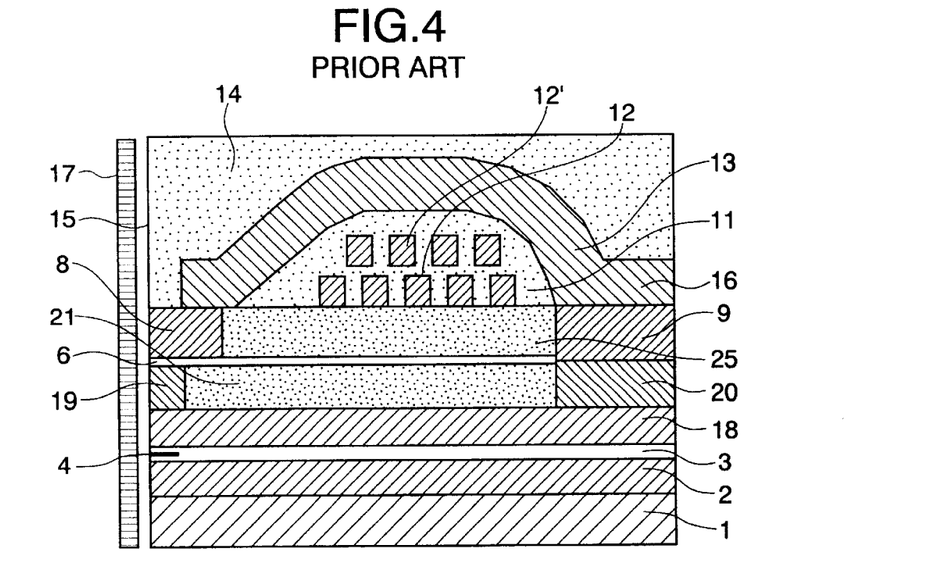

To solve this problem, a method shown in FIG. 4 has been proposed. In this method, a lower magnetic pole front end layer 19 and a lower magnetic pole rear end layer 20 are arranged on the lower magnetic pole main layer 18, and the gaps between them is filled with a lower non-magnetic insulating layer 21 and is planarized. A recording gap layer 6 is formed. A resist frame is formed on this planarized surface and the upper magnetic pole front end layer 8 is then formed. In this way, the small track width can be formed with a high level of accuracy. However, according to this method, too, the lower magnetic pole front end layer 19 is processed by means such as ion milling with the front end portion of the upper magnetic pole front end layer 8 as a mask, and a projection portion of the lower magnetic pole front end layer 19 called a "trimming part" is formed. At this time, the width of the upper magnetic pole front end layer 8 to serve as the track width decreases as a result of ion milling. Therefore, a problem yet remains unsolved in that accuracy of the track width cannot be sufficiently improved due to the limit of processing accuracy of ion milling even when accuracy of the track width formed by the frame plating method becomes high because the final track width is formed by processing such as ion milling.

Figure 5:
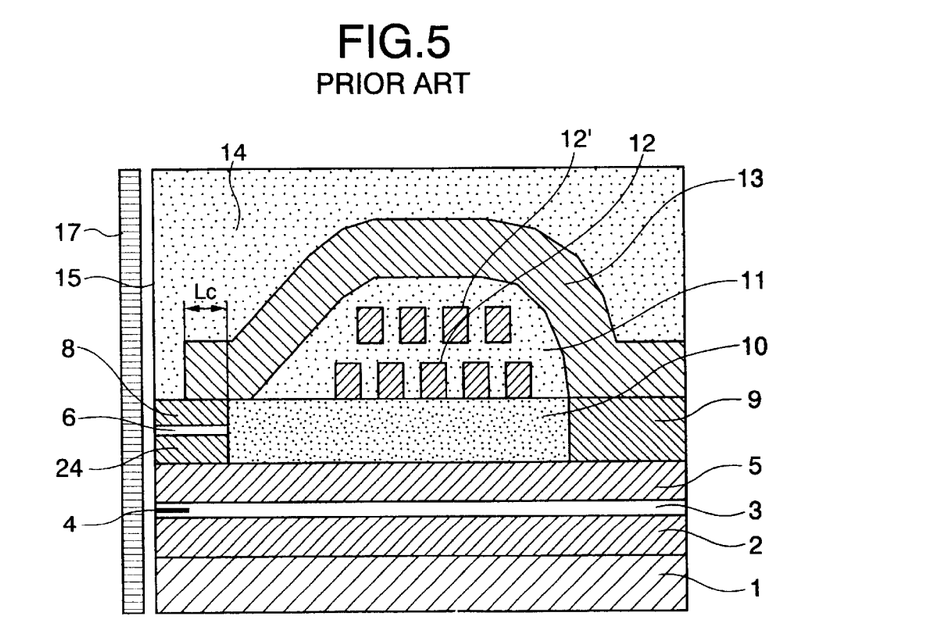

Therefore, JP-A-11-7609 describes a method that forms the projection part of the lower magnetic pole without executing the trimming process by ion milling. This method forms the projection part of the lower magnetic pole, the recording gap layer and the upper magnetic pole front end layer inside a resist frame having the same shape in accordance with a plating method. In this case, only frame plating is used without conducting ion milling to form the track width, and the frame is formed on the planar surface of the lower magnetic pole 5 as shown in FIG. 5. Therefore, this method can acquire high track width accuracy. However, since the length of the lower magnetic pole projection layer 24 is equal to that of the upper magnetic pole front end layer 8, the contact length Lc cannot be sufficiently secured between the upper magnetic pole top layer 13 and the upper magnetic pole front end layer 8 when the gap depth is reduced. In this case, the recording magnetic field does not become high. When the contact length is increased, the gap depth becomes great, too. Consequently, the recording magnetic field does not become high, either. On the other hand, the recording magnetic field intensity required for the recording head has becomes higher and higher with the increase of the recording density, and a demand for a recording head that has a small track width and yet generates such a high recording magnetic field intensity has become higher and higher.

SUMMARY OF THE INVENTION

It is an object of the invention to provide a thin film magnetic head that can generate a high recording magnetic field even when a track width of a recording head decreases.

To accomplish a high recording magnetic field at a small track, a thin film magnetic head according to the invention includes a lower magnetic pole front end layer on a lower magnetic pole main layer, and a lower magnetic pole projection layer, a recording gap layer and an upper magnetic pole front end layer each having substantially the same planar shape are formed on this lower magnetic pole front end layer. The length of the lower magnetic pole projection layer, the recording gap layer and the upper magnetic pole front end layer from the air bearing surface to the head back direction is greater than the length of the lower magnetic pole front end layer. The thickness of the lower magnetic pole projection layer is smaller than the thickness of the lower magnetic pole front end layer. Since the thickness of the lower magnetic pole projection layer is relatively small, the lower magnetic pole projection layer in the proximity of the lower end portion of the lower magnetic pole front end layer gets into magnetic saturation and the leakage flux from the rear portion of the lower magnetic pole projection layer to the lower magnetic pole front end portion is restricted. Therefore, the gap depth is substantially defined by the rear end portion of the lower magnetic pole front end layer. On the other hand, since the upper magnetic pole front end layer is longer than the lower magnetic pole front end layer to serve as the gap depth, the contact length with the upper magnetic pole top layer can be sufficiently secured. As a result, a high recording magnetic field can be acquired.

Because the lower magnetic pole front end layer and the lower magnetic pole projection layer can be formed of mutually different materials, it becomes possible to constitute the lower magnetic pole front end layer by a magnetic material having high corrosion resistance and the lower magnetic pole projection layer by a magnetic material having high saturation magnetic flux density. In this way, a recording head satisfying both high corrosion resistance and high recording magnetic field can be accomplished.

It is another object of the invention to provide a method of producing a thin film magnetic head capable of accomplishing a high-precision track width.

In the invention, a lower magnetic pole projection layer, a recording gap layer and an upper magnetic pole front end layer each having substantially the same planar shape are formed. These layers are formed by a plating method inside the same resist frame formed on a planar surface constituted by a lower magnetic pole front end layer and a lower non-magnetic insulating layer. Since the resist frame is formed on the planar surface, scattering and irregular reflection of exposure light are less and eventually, a resist frame having high accuracy can be formed. Furthermore, since the lower magnetic pole projection layer, the recording gap layer and the upper magnetic pole front end layer are formed inside the same resist frame, the projection portion of the lower magnetic pole can be formed without employing ion milling and a narrow track width having extremely high accuracy can be formed.

Other objects, features and advantages of the invention will become apparent from the following description of the embodiments of the invention taken in conjunction with the accompanying drawings.

BRIEF DESCRIPTION OF THE DRAWINGS

FIG. 10A to FIG. 10H are sectional views at production steps in a production method of the thin film magnetic head according to the embodiment of the invention.

DESCRIPTION OF THE EMBODIMENTS

Preferred embodiments of the invention will be hereinafter explained in detail with reference to the accompanying drawings.

Figure 2:
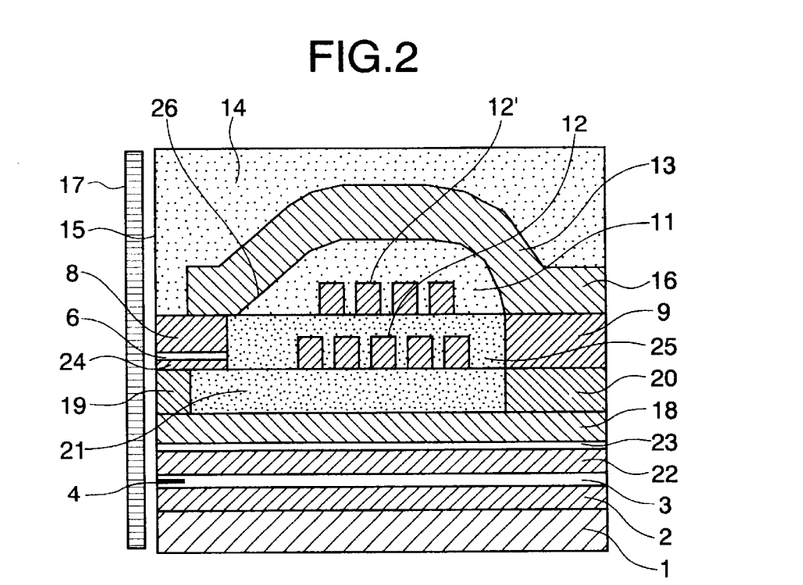
FIG. 2 is a sectional view of the thin film magnetic head shown in FIG. 1.

FIG. 2 is a sectional view of a thin film magnetic head according to the invention. A lower magnetic shield 2 made of a soft magnetic material for improving reading resolution and excluding influences of an external magnetic field is arranged on a substrate 1 made of a non-magnetic material. A reading gap 3 made of a non-magnetic insulating material is arranged on the lower magnetic shield 2. A reading element 4 of an MR or GMR element is arranged in the reading gap 3. An upper magnetic shield 22 is arranged on the reading element 4, and a separate layer 23 made of a non-magnetic material for separating a recording head from a reading head is arranged on the upper magnetic shield 22. On this separate layer 23 are further arranged a lower magnetic pole main layer 18, a lower magnetic pole front end layer 19 and a lower magnetic pole rear end layer 20. A lower non-magnetic insulating layer 21 is filled between the lower magnetic pole front end layer 19 and the lower magnetic pole rear end layer 20. The lower magnetic pole front end layer 19, the lower magnetic pole rear end layer 20 and the lower non-magnetic insulating layer 21 are polished and planarized. A resist frame is formed on these layers 19, 20 and 21, and a lower magnetic pole projection layer 24, a recording gap layer 6 and an upper magnetic pole front end layer 8 are formed by plating inside the same resist frame. Further, an upper magnetic pole rear end layer 9, an upper non-magnetic insulating layer 25 and a lower coil 12 are arranged. The surfaces of the upper magnetic pole front end layer 8, the upper magnetic pole rear end layer 9 and the upper non-magnetic insulating layer 25 are polished and planarized. A coil insulating layer 11 and an upper coil 12' are arranged on the surfaces so planarized. After an upper magnetic pole top layer 13 is arranged, a protective layer 14 covers the head as a whole for protection. The upper magnetic pole top layer 13 is arranged in such a fashion that its front end is recessed from an air bearing surface. The rear end 16 of the upper magnetic pole top layer 13 and the upper magnetic pole rear end layer 9 are magnetically connected to the lower magnetic pole rear end layer 20. The lower coil 12 and the upper coil 12' are so constituted as to wind the upper magnetic pole rear end layer 9 and the rear end 16 of the upper magnetic pole top layer. When a recording current is applied to the lower coil 12 and the upper coil 12', a magnetic flux is induced in the upper magnetic pole front end layer 8, the upper magnetic pole top layer 13, the upper magnetic pole rear end layer 9, the lower magnetic pole rear end layer 20, the lower magnetic pole main layer 18, the lower magnetic pole front end layer 19 and the lower magnetic pole projection layer 24. As a recording magnetic flux occurs from the distal end of the recording gap, a signal is recorded to a recording medium 17 that moves while spaced apart by a very small distance from the air bearing surface 15. Incidentally, this embodiment employs the construction in which the separate layer 23 separates the upper magnetic shield 22 from the lower magnetic pole main layer 18. However, the lower magnetic pole 5 may also function as the upper magnetic shield in the same way as in the prior art example shown in FIG. 3.

Figure 1:
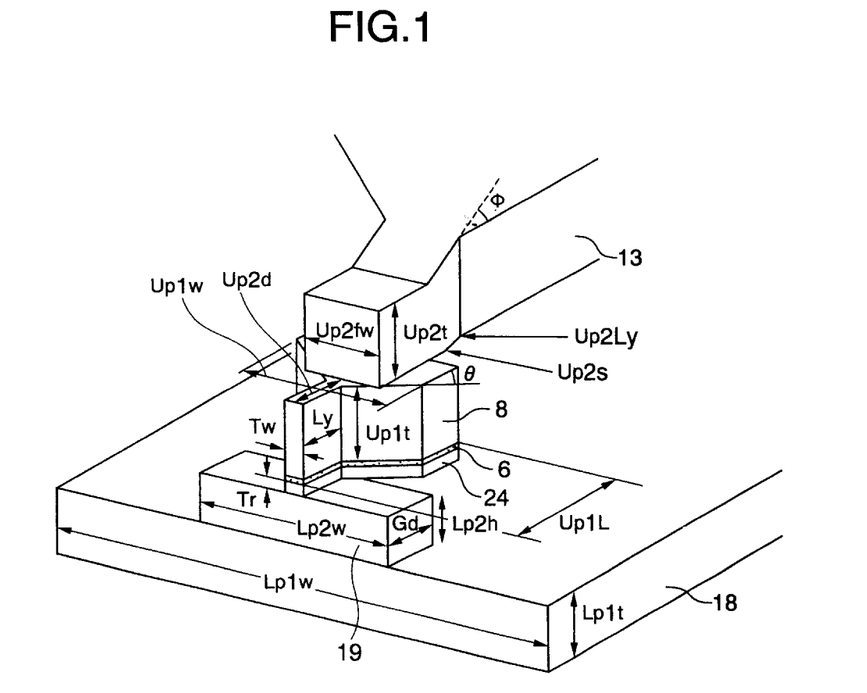
FIG. 1 is a perspective view showing a thin film magnetic head according to an embodiment of the invention.

The perspective view of FIG. 1 shows a construction of the thin film magnetic head of the invention in the proximity of the head distal end. Incidentally, this drawing shows only a part of the lower magnetic pole main layer 18, the lower magnetic pole front end layer 19, the lower magnetic pole projection layer 24, the recording gap layer 6, the upper magnetic front end layer 8 and the upper magnetic layer top layer 13. As shown in the drawing, the lower magnetic pole front end layer 19 in the thin film magnetic head according to the invention has a width Lp2w greater than a track width Tw. This head has a length corresponding to the gap depth Gd and a height Lp2h. The lower magnetic pole projection layer 24, the recording gap layer 6 and the upper magnetic pole front end layer 8 having substantially the same planar shape with one another are arranged on the lower magnetic pole front end layer 19. The width of these layers on the air bearing surface corresponds to the recording track width Tw. The thickness of the projection layer corresponds to a trim depth Tr of the magnetic head according to the prior art. The lower magnetic pole projection layer 24, the recording gap layer 6 and the upper magnetic pole front end layer 8 have a width substantially equal to the track width from the air bearing surface to the magnetic pole expansion position Ly in the backward direction of the head, and the width increases from the magnetic pole expansion position Ly towards the back of the head with an opening angle θ to a maximum width Up1w. The upper magnetic pole front end layer 8 has a length Up1L and a thickness Up1t. The distal end of the upper magnetic pole top layer 13 is spaced apart by the upper magnetic pole depth Up2d from the air bearing surface. The upper magnetic pole top layer 13 has a width Up2fw and a thickness Up2t at its distal end. The upper magnetic pole top layer 13, too, has a shape such that its width increases from a contraction position Up2Ly towards the back of the head with an opening angle Φ. The upper magnetic pole top layer 13 remains flat till a rise position Up2s of the upper magnetic pole top layer, and the upper magnetic pole top layer 13 is formed on a slope 26 of the coil insulating layer from this position Up2s.

The magnetic field intensity of the thin film magnetic head of the invention having the construction described above is calculated through computer simulation and is compared with a recording magnetic field intensity of the thin film magnetic head of the prior art. The thin film magnetic head of the invention has a track width Tw=0.35 μm, a gap length GL=0.13 mm, Gd=1 mm, Lp2w=8 mm, Lp2h=1.5 μm, Ly=0.8 mm, Up1t=2 mm, Up1L=3.5 mm, Up1w=4 mm, θ=45°, Up2d=1 mm, Up2t=3 mm, Up2w=3 mm, Up2Ly=4 mm, Up2s=4 mm, Φ=45° and Up2w=26 mm. The change of the recording magnetic field intensity resulting from the change of the thickness Tr of the lower magnetic pole projection layer is calculated. Incidentally, the lower magnetic pole main layer 18 has a width Lp1w=100 mm and a thickness Lp1t=2 mm. The magnetic materials used for the thin film magnetic head are a 45Ni—Fe film (saturation flux density Bs=1.68 T) for the lower magnetic pole main layer 18, the upper magnetic pole top layer 13 and the upper magnetic pole rear end layer 9, and a CoNiFe film (Bs=2.0 T) for the lower magnetic pole front end layer 19, the lower magnetic pole projection layer 24, the lower magnetic pole rear end layer 20 and the upper magnetic pole front end layer 8. Magnetic motive force is 0.36 AT.

On the other hand, the magnetic field intensity is similarly calculated for a thin film magnetic head that uses the lower magnetic pole front end layer shown in FIG. 4 but does not use the lower magnetic pole projection layer, and has the same dimension as described above. However, the trim depth Tr is changed in place of the lower magnetic pole projection layer in this calculation. The magnetic materials used are the same as those of the magnetic head of the invention. However, in the thin film magnetic head according to the prior art shown in FIG. 3, the thickness Ilh of the non-magnetic layer 7 defining the gap depth is 0.4 mm, the film thickness Lp1t of the lower magnetic pole is 2.5 mmm, the magnetic pole expansion position Ly is 0.8 mm and the gap depth Gd is 0.8 mm. The other dimensions are the same as those of the thin film magnetic head of the invention. The magnetic materials are the same as those of the thin film magnetic head of the invention. For comparison, however, the lower magnetic pole 5 is a CoNiFe film (Bs=2.0 T). Further, the magnetic film intensity is calculated for a thin film magnetic head according to the prior art that does not uses the lower magnetic pole front end layer but uses the lower magnetic pole projection layer 24 shown in FIG. 5. This head has the same dimension as that of the thin film magnetic head according to the invention with the exception of the lower magnetic pole front end layer.

Figure 6:
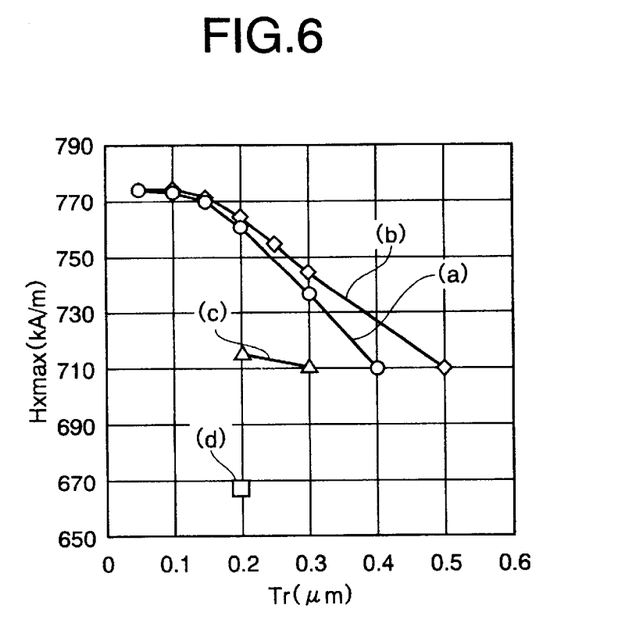
FIG. 6 is a graph showing a relation between a thickness Tr of a lower magnetic pole projection layer of each of the thin film magnetic head according to the embodiment of the invention and the thin film magnetic head according to the prior art and a recording magnetic field intensity.

FIG. 6 shows the maximum magnetic field intensity Hxmax at a position spaced apart by 25 nm from the air bearing surface as a medium center at the center position of the track width in the medium running direction. This value will be hereinafter called "magnetic field intensity". Symbol (a) in the drawing represents the magnetic field intensity of the thin film magnetic head of the invention having the lower magnetic pole front end layer and the lower magnetic pole projection layer. Symbol (b) represents the magnetic field intensity of the thin film magnetic head shown in FIG. 4 that has the lower magnetic pole front end layer but does not have the lower magnetic pole projection layer. Symbol (c) represents the magnetic field intensity of the thin film magnetic head according to the prior art shown in FIG. 3. Symbol (d) represents the magnetic field intensity of the thin film magnetic head according to the prior art shown in FIG. 5 that does not have the lower magnetic pole front end layer but has the lower magnetic head projection layer.

As shown in the drawing, the magnetic field intensity (c) of the thin film magnetic head according to the prior art is approximately 710 KA/m (90,000 e). The magnetic field intensity (d) of the thin film magnetic head shown in FIG. 5 that does not have the lower magnetic pole front end layer but has the lower magnetic pole projection layer drastically drops down to approximately 670 KA/m (84,000 e). This is because the gap depth is equal to the length Up1L of the upper magnetic pole front end layer and consequently, the leakage flux from the upper magnetic pole front end layer 8 to the lower magnetic pole 5 through the lower magnetic pole projection layer 24 is extremely great. In the construction of the invention, when the length Up1L of the upper magnetic pole front end layer, for example, is decreased in the same way as the gap depth of the thin film magnetic head according to the prior art so as to reduce the leakage flux, the contact length Lc between the upper magnetic pole front end layer and the upper magnetic pole top layer becomes remarkably small and the magnetic field intensity cannot be increased eventually. As described above, the attempt to improve track width accuracy by forming the lower magnetic pole projection layer, the recording gap layer and the upper magnetic pole front end layer each having substantially the same planar shape inside the same resist frame without conducting trimming such as ion milling encounters the problem of the drop of the magnetic field intensity.

On the other hand, in the case of the thin film magnetic head having the lower magnetic pole front end layer shown in FIG. 4, the magnetic field intensity (b) decreases with the increase of the trim depth Tr but is higher by about 32 KA/m (4,000 e) at Tr=0.3 μm and by about 48 KA/m at Tr=0.2 μm than the thin film magnetic head (c) according to the prior art. This is because the lower magnetic pole front end layer 19 increases the distance between the upper magnetic pole front end layer 8 and the lower magnetic pole main layer 18 and the leakage flux between them decreases. On the other hand, the magnetic flux density (a) of the thin film magnetic head according to the invention that includes both lower magnetic pole front end layer 19 and lower magnetic pole projection layer 24 drops with the increase of the thickness Tr of the lower magnetic pole front end layer, exhibits a high magnetic field intensity substantially equal to that of the thin film magnetic head (b) using the lower magnetic pole front end layer shown in FIG. 4 at Tr=0.2 μm and becomes lower by only about 8 KA/m (1,000 e) than the thin film magnetic head (b) at Tr=0.3 μm. The reasons why the thin film magnetic head of the invention including both lower magnetic pole front end layer and lower magnetic pole projection layer exhibits a smaller drop of the magnetic field intensity than the thin film magnetic head of FIG. 5 not having the lower magnetic pole front end layer but having the lower magnetic pole projection layer are as follows. Since the lower magnetic pole front end layer 19 exists and secures the distance from the lower magnetic pole main layer 18, the magnetic flux does not easily leak to the lower magnetic pole main layer 18 even when the magnetic flux leaks from the upper magnetic pole front end layer 8 to the lower magnetic pole projection layer 24. Further, magnetic saturation of the lower magnetic pole projection layer 24 makes it difficult for the magnetic flux to permeate in the proximity of the rear end surface of the lower magnetic pole front end layer 19 as the gap depth for the leakage magnetic flux from the lower magnetic pole projection layer 24 to the lower magnetic pole front end layer 19.

As shown in FIG. 6, when the film thickness Tr of the lower magnetic pole projection layer is greatly increased beyond 0.35 μm in the thin film magnetic head according to the invention, the magnetic field intensity becomes lower than that of the thin film magnetic head of the prior art. Therefore, the thickness of the lower magnetic pole projection layer must be 0.35 μm. When the thickness of the lower magnetic pole projection layer is less than 0.05 μm, the leakage magnetic field increases in the track width direction and the erasing width increases. Therefore, the thickness of the lower magnetic pole projection layer must be at least 0.05 μm and further preferably at least 0.1 μm.

Figure 7:
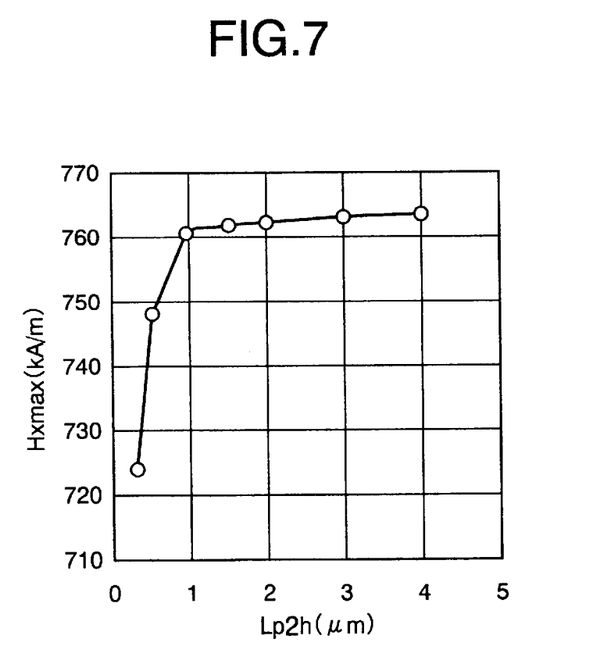
FIG. 7 is a graph showing a relation between a height Lp2h of a lower magnetic pole front end layer of the thin film magnetic head according to the embodiment of the invention and the recording magnetic field intensity.

FIG. 7 shows the change of the magnetic field intensity when the height Lp2h of the lower magnetic pole front end layer of the thin film magnetic head of the invention is changed. The thickness Tr of the lower magnetic pole projection layer is 0.2 μm and other conditions are kept the same as those shown in FIG. 6. As shown in the drawing, the magnetic field intensity increases with Lp2h and becomes substantially constant at about 1 μm. Even when Lp2h is 0.3 μm, the magnetic field intensity scores a higher value than that of the thin film magnetic head of the prior art shown in FIG. 6(c). When Lp2h is greater than 0.7 μm, the magnetic field intensity is about 760 KA/m (95,000 e) and a sufficient field increasing effect can be acquired. The greater the Lp2h value, the higher becomes the magnetic field intensity. However, when Lp2h is excessively great, the distance between the recording gap and the reading gap becomes so great that format efficiency of the magnetic disk apparatus drops. Therefore, Lp2h is 3 μm or below and further preferably 2 μm or below.

Figure 8:
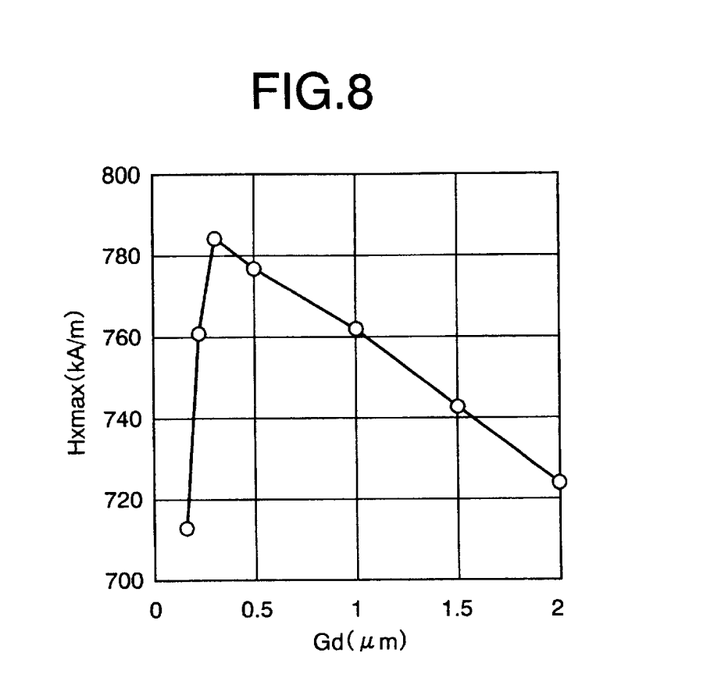
FIG. 8 is a graph showing a relation between a gap depth Gd of the thin film magnetic head according to the embodiment of the invention and the recording magnetic field intensity.

FIG. 8 shows the change of the magnetic field intensity when the gap depth Gd of the thin film magnetic head of the invention is changed. The thickness Tr of the lower magnetic pole projection is 0.2 μm and other conditions are the same as those shown in FIG. 6. As shown in the drawing, the magnetic field intensity increases with the decrease of Gd, attains maximum at Gd of about 0.3 μm and thereafter decreases. High magnetic field intensity can be obtained even at Gd of less than 0.3 μm, but the change of the magnetic field with the change of Gd becomes drastic and fluctuation of the recording characteristics is likely to develop. Therefore, the Gd value is preferably at least 0.3 μm. On the other hand, the magnetic field intensity drastically drops when Gd exceeds 2 μm. Therefore, the Gd value is preferably 2 μm or below.

Figure 9:
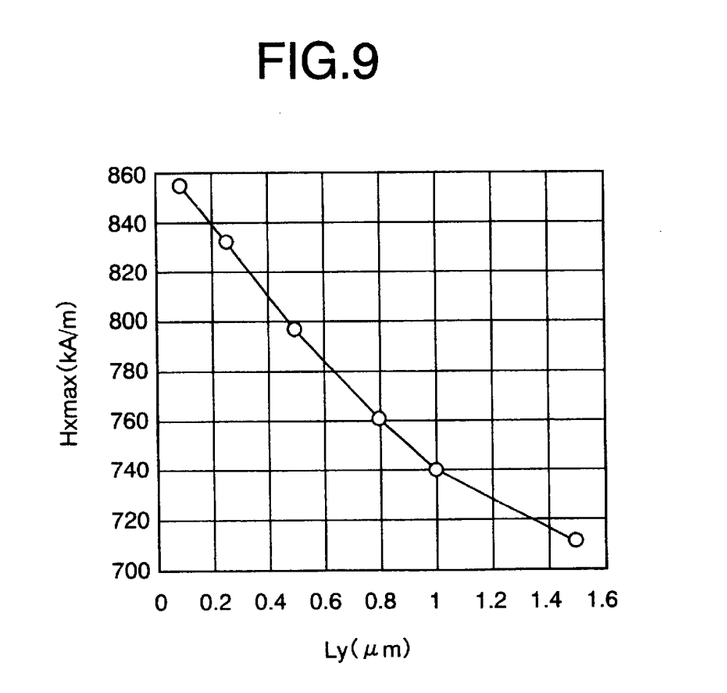
FIG. 9 is a graph showing a relation between a magnetic pole expansion position Ly of an upper magnetic pole front end layer and the recording magnetic field intensity.

FIG. 9 shows the change of the magnetic field intensity with the magnetic pole expansion position Ly of the upper magnetic pole front end layer. The thickness Tr of the lower magnetic pole projection layer is 0.2 μm, and other conditions are the same as those shown in FIG. 7. The magnetic field intensity greatly increases with the decrease of Ly. When Ly exceeds 1.4 μm, the magnetic field intensity drops below the intensity of the thin film magnetic head of the prior art. Therefore, Ly is preferably at least 1.4 μm. The smaller the Ly value, the greater becomes the magnetic field intensity. However, the Ly value of less than 0.2 μm may exert adverse influences on track width accuracy due to the limit of resolution of the photo resist, and Ly is preferably at least 0.2 μm.

FIG. 10 to FIG. 12 show the outline of a production method of a thin film magnetic head according to the invention.

Figure 10A:
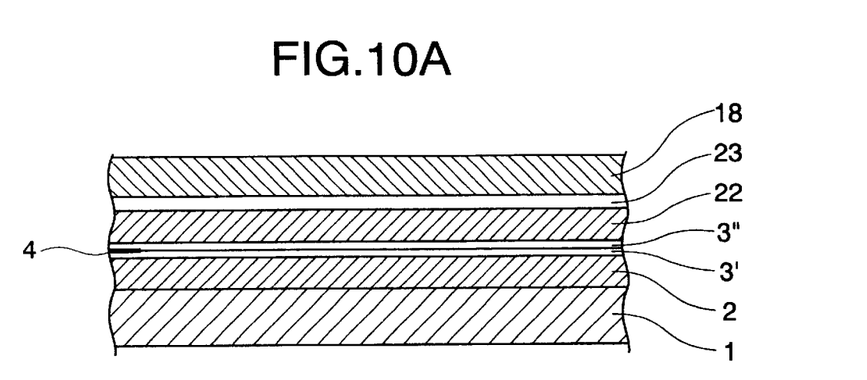

A substrate 1 is first prepared and a lower magnetic shield 2 is formed on the substrate 1 as shown in FIG. 10A. The substrate can uses ceramic materials having high hardness such as $Al_2O_3$—TiC. An insulating film of $Al_2O_3$, for example, is preferably formed on the substrate 1 to improve its planarity and electric insulating property though the insulating film is not shown in the drawing.

The lower magnetic shield uses a soft magnetic film such as an 82NiFe film. The lower magnetic shield 2 can be formed through means such as frame plating or sputtering. According to the frame plating method, a material equivalent to the lower magnetic shield 2 is formed as a seed film to a thickness of about 0.1 μm by sputtering, and a photo resist is then applied to the seed film. The resist is then exposed and photo-sensitized through a mask having the shape of the lower magnetic pole, and the photo resist of the portion to serve as the lower magnetic pole is dissolved away with a solvent to fabricate a frame. Next, a material of the lower magnetic shield is plated by means such as electrolytic plating inside the frame with the seed film as an electrode, and unnecessary portions of the seed film are removed by ion milling with the lower magnetic shield as the mask. In this way, the lower magnetic shield having a predetermined shape is acquired.

When the lower magnetic shield 2 is fabricated by sputtering, the lower magnetic shield material is formed on the substrate 1 by sputtering, and the shape of the lower magnetic shield 2 is formed by use of the photo resist on the former. Ion milling or chemical etching is then conducted to remove the unnecessary magnetic shield material that adheres with the photo resist as the mask to give the lower magnetic shield 2 having a desired shape.

Next, the layers of the lower reading gap 3', the reading element 4 and the upper reading gap 3 are serially formed in the order named. The lower reading gap and the upper reading gap use an insulating film such as $Al_2O_3$. The reading element can use a GMR element, a TMR element, or the like. These elements are equipped with predetermined fixing layer, free layer, permanent magnet film for fixing magnetic domains, electrode film for supplying a reading current, and so forth.

The upper magnetic shield 22 is further formed on the members described above. The upper magnetic shield 22 is made of a soft magnetic material such as a NiFe film in the same way as the lower magnetic shield 22, and can be fabricated by means such as sputtering or frame plating.

Next, the separate layer 23 is formed. The separate layer 23 can use a non-magnetic insulating film such as $Al_2O_3$ or a non-magnetic metal film such as Pd or NiP. Though sputtering can be used to form these films, plating can also be used to form the non-magnetic metal film. In this case, the number of production steps can be decreased because the upper magnetic shield 22, the separate layer 23 and the lower magnetic pole main layer 18 can be formed by plating by use of the same resist frame.

Next, the lower magnetic pole main layer 18 is formed on the layers described above. The lower magnetic pole main layer 18 can use the 82NiFe film in the same way as the upper and lower magnetic shields, but a film having higher specific resistance and higher saturation flux density than the 82NiFe film is more preferred. An example of such a material is a magnetic film having a 45NiFe composition as the principal components. The saturation flux density of this 45NiFe film is 1.6 to 1.7 T and is higher than that of the 82NiFe film, i.e. about 1.0 T. Its specific resistance is 45 to 55 μΩcm and is higher than that of the 82NiFe film, that is, about 22 μΩcm. When the specific resistance is high, the advantage can be acquired in that an eddy current loss can be reduced at a high frequency and high frequency recording characteristics can be improved. When the saturation flux density is high, the advantage can be acquired in that the magnetic field intensity does not drop even when the thickness of the lower magnetic pole main layer is reduced. Sputtering or frame plating can be employed to form the lower magnetic pole main layer in the same way as the upper and lower magnetic shields. Besides the 45NiFe film described above, it is possible to use a nano-crystalline sputter film such as an Fe—Ta—N film or an Fe—Ta—C film each having Bs=1.4 to 1.6 T, or an amorphous sputter film such as a Co—Zr film, a Co—Ta—Zr film or a Co—Nb—Zr film having Bs=1 to 1.6 T.

Figure 10B:
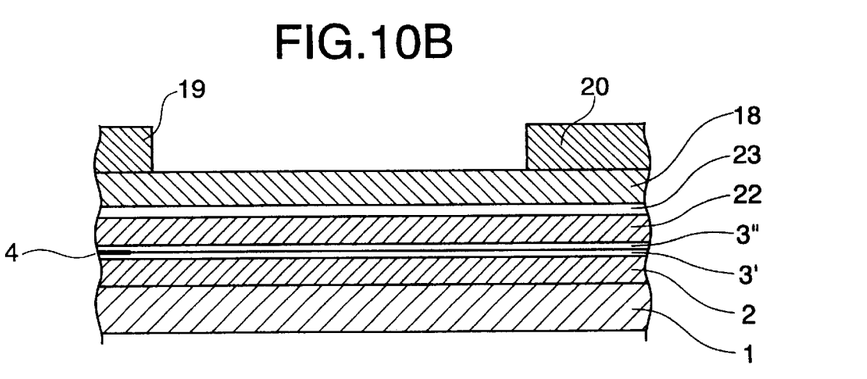

Next, the lower magnetic pole front end layer 19 and the lower magnetic pole rear end layer 20 are formed on the lower magnetic pole main layer 18 as shown in FIG. 10B. These layers can also be formed by first forming a magnetic film by sputtering and shaping the magnetic film into a predetermined shape by ion milling or chemical etching. In the thin film magnetic film according to the invention, however, frame plating that provides high pattern formation accuracy is preferably employed. When the shape of the lower magnetic pole front end layer 19 is formed by ion milling, the rear end face of the lower magnetic pole front end layer has an inclination to the air bearing surface, and positional accuracy of the rear end face of the lower magnetic pole front end layer 19 that determines the gap depth drops. Another problem is that a processing time becomes elongated to fabricate the lower magnetic pole front end layer 19 having a relatively large thickness of 0.5 to 2 μm by ion milling. It is difficult to acquire high dimensional accuracy when the shape of the lower magnetic pole front end layer is formed by chemical etching. The lower magnetic pole front end layer can use the 46NiFe film described above as its material. A CoNiFe film is also available as a material having a high saturation flux density. This material has a high saturation flux density of from about 1.8 to about 2.4 T when its composition is selected, and both plating and sputtering can be used to form the film. Besides the CoNiFe film, it is possible to use a Co—Fe plating or sputter film and a sputter film of a Co—Fe—N film and an Fe—Ta—N film.

On the other hand, the lower magnetic pole rear end layer 20 can use a separate material from that of the lower magnetic pole front end layer 19 by fabricating a resist frame. To simplify the production steps, however, it is preferred to fabricate the resist frame simultaneously with the lower magnetic pole front end layer 19 and to use the same material as that of the lower magnetic pole front end layer 19. When the lower magnetic pole front end layer is the CoNiFe film and the lower magnetic pole rear end layer 20 uses a separate material, it is preferred to use a material having high specific resistance such as the 46NiFe film so as to reduce the eddy current at a high frequency.

Figure 10C:
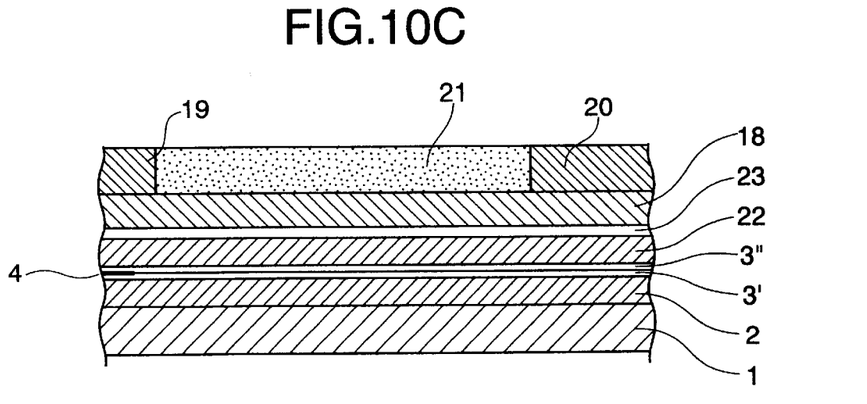

Next, the groove between the lower magnetic pole front end layer 19 and the lower magnetic pole rear end layer 20 is filled with a lower non-magnetic insulating layer 21 such as $Al_2O_3$, and polishing such as CMP (Chemical Mechanical Polishing) is conducted so that the upper surfaces of the lower magnetic front end layer 19, the lower magnetic pole rear end layer 20 and the lower non-magnetic insulating layer 21 have substantially the same surface (FIG. 10C).

Figure 10D:
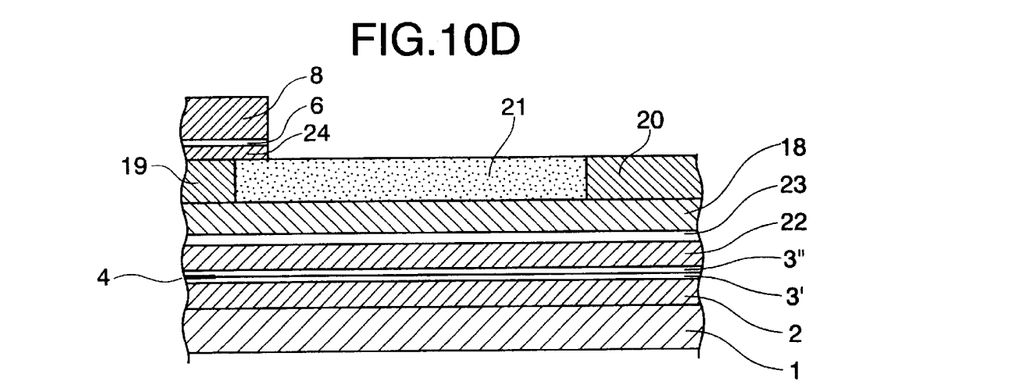

A seed layer for plating (not shown) is formed to a thickness of about 0.05 μm on the surfaces of the lower magnetic pole front end layer 19 and the lower non-magnetic insulating layer 21 so planarized as shown in FIG. 10D. The lower magnetic pole projection layer 24, the recording gap layer 6 and a resist frame having a shape to serve as the upper magnetic pole front end layer 8 are formed on the planarized surface of the lower magnetic pole front end layer 19. Next, electrolytic plating is carried out for the lower magnetic pole front end layer 19, the recording gap layer 9 and the upper magnetic pole front end layer 8 in this order inside the resist frame to form each layer. The resist frame is then dissolved away with a solvent, and the seed film is removed by ion milling with the upper magnetic pole front end layer 8 as the mask. In this way, the lower magnetic pole front end layer 24, the recording gap layer 6 and the upper magnetic pole front end layer 8 can be simultaneously formed.

When producing the thin film magnetic head of the invention, the seed film for conducting electrolytic plating is formed as described above, and after plating is formed on the lower magnetic pole projection layer, the recording gap layer and the upper magnetic pole front end layer, the seed film is removed by ion milling. In the case of the thin film magnetic head according to the prior art, the projection part is processed as a whole by ion milling. Therefore, the track width simultaneously changes with the result of the drop of track width accuracy. In the processing method of the thin film magnetic head according to the invention, however, it is necessary to only remove the seed film that is thinner than the lower magnetic pole projection layer, and influences on track width accuracy are small. When the seed film is thick, however, the influences on track width accuracy exist in the same way as in the formation of the projection portion of the thin film magnetic head of the prior art, and the thickness of the seed film must be 0.2 μm or below, preferably 0.1 μm or below.

The material used for the lower magnetic pole projection layer 24 and the upper magnetic pole front end layer 8 must have high saturation flux density to generate a high recording magnetic field, and can use the CoNiFe film described above. The recording gap layer 6 can use a non-magnetic metal material such as Pd and NiP. The recording gap layer 6 must basically be non-magnetic, but when it has weak magnetism having a saturation flux density of 0.02 T or below, such weak magnetism hardly affects the recording magnetic field. In the thin film magnetic head of the invention, the lower magnetic pole projection layer, the recording gap layer and the upper magnetic pole front end layer are basically formed inside the resist frame by plating, but other methods can also be used. For example, it is possible to employ a method that forms a non-magnetic insulating film such as a $SiO_2$ film on the lower magnetic pole front end layer 19, then forms a recess by reactive ion etching, and fills and forms sputter films of the lower magnetic pole projection layer 24, the recording gap layer 6 and the upper magnetic pole front end layer 8 inside the recess. In this case, it is possible to use the sputter films such as a CoNiFe film, a Co—Fe film, a Co—Fe—N film and a Fe—Ta—N film.

In the thin film magnetic head of FIG. 4 that uses the lower magnetic pole front end layer, the lower magnetic pole front end layer 19 is trimmed by ion trimming, or the like, with the shape of the upper magnetic pole front end layer 8 as the mask to form the projection part of the lower magnetic pole front end layer. Therefore, the material of the projection part is basically the same as the material of the lower magnetic pole front end layer. In the thin film magnetic head according to the invention, on the other hand, the lower magnetic pole projection layer 24 is separately formed on the lower magnetic pole front end layer 19, and a separate material can be used. Therefore, it is possible to use the CoNiFe film having high saturation flux density for the lower magnetic pole projection layer 24 and the upper magnetic pole front end layer 8 in the proximity of the gap, and the 45NiFe film having lower saturation flux density but having higher corrosion resistance for the lower magnetic pole front end layer 19. This is advantageous to simultaneously satisfy both requirements for recording performance and corrosion resistance in the thin film magnetic head of the invention in which the lower magnetic pole front end layer 19 having a large area is exposed on the air bearing surface.

Figure 10E:
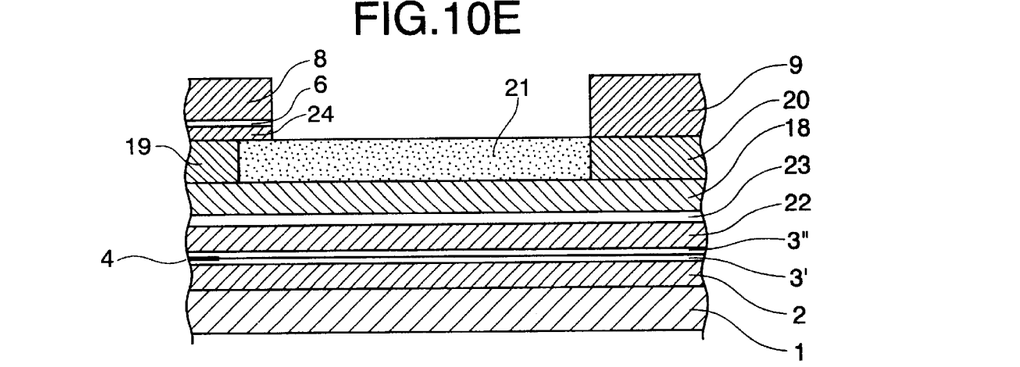

Next, as shown in FIG. 10E, the upper magnetic pole rear end layer 9 is formed by frame plating. To form the upper magnetic pole rear end layer 9, the lower magnetic pole projection layer 24, the recording gap layer 6 and the upper magnetic pole front end layer 8 are first covered with a resist to avoid influences of the formation step of the upper magnetic pole rear end layer 9. In the thin film magnetic head shown in FIGS. 3 and 4, the resist frames of the upper magnetic pole front end layer 19 and the upper magnetic pole rear end layer 9 are simultaneously formed to simplify the production steps, and the same magnetic pole material is formed in most cases by plating inside the frame. In the thin film magnetic head according to the invention, on the other hand, the resist frame is formed separately from the upper magnetic pole front end layer 19 as described above, and the magnetic pole material for the upper magnetic pole rear end layer 9 is formed inside the frame. Therefore, a material suitable for the upper magnetic pole rear end layer 9 can be used. The material for the upper magnetic pole rear end layer preferably has high specific resistance, though its saturation flux density is not high, and can suppress the eddy current loss. Therefore, in the thin film magnetic head according to the invention, a material having high specific resistance such as 45NiFe is preferably and basically used on the upper magnetic pole rear end layer 9 unlike the upper magnetic pole projection layer 24 or the upper magnetic pole front end layer 8.

Figure 10F:
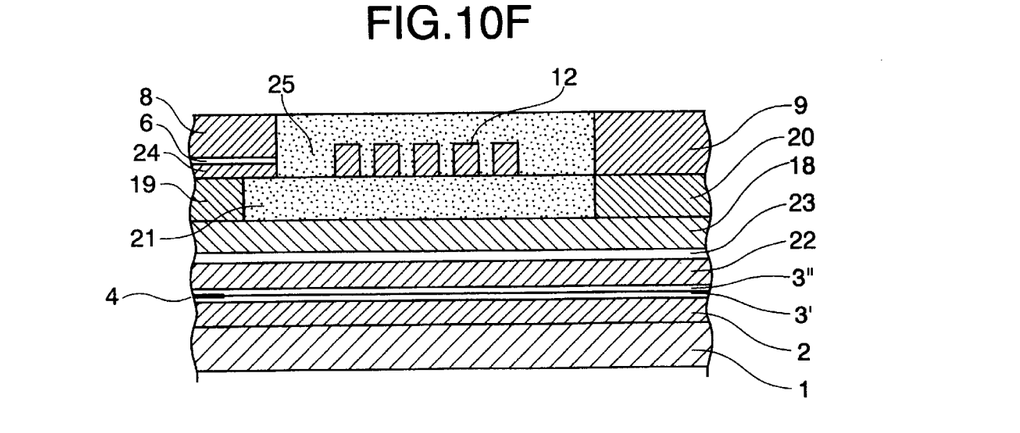

Next, the lower coil 12 is formed on the lower non-magnetic filling layer 21 by frame plating. The gap of the coil 12 is filled with the upper non-magnetic insulating layer 25 made of $Al_2O_3$, and CMP is conducted so that the upper surfaces of the upper magnetic pole front end layer 8, the upper magnetic pole rear end layer 9 and the upper non-magnetic insulating layer 25 have substantially the same surface.

Figure 10G:
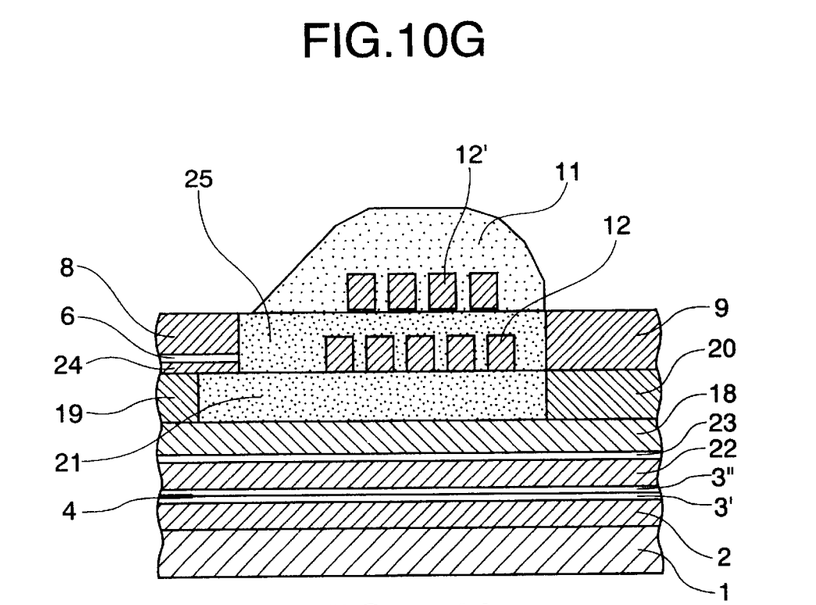

The upper coil 12' is then formed on the upper non-magnetic filling layer 25 by frame plating as shown in FIG. 10G, and the gap of the coil 12' is filled with a coil insulating layer 11 such as a resist.

Figure 10H:
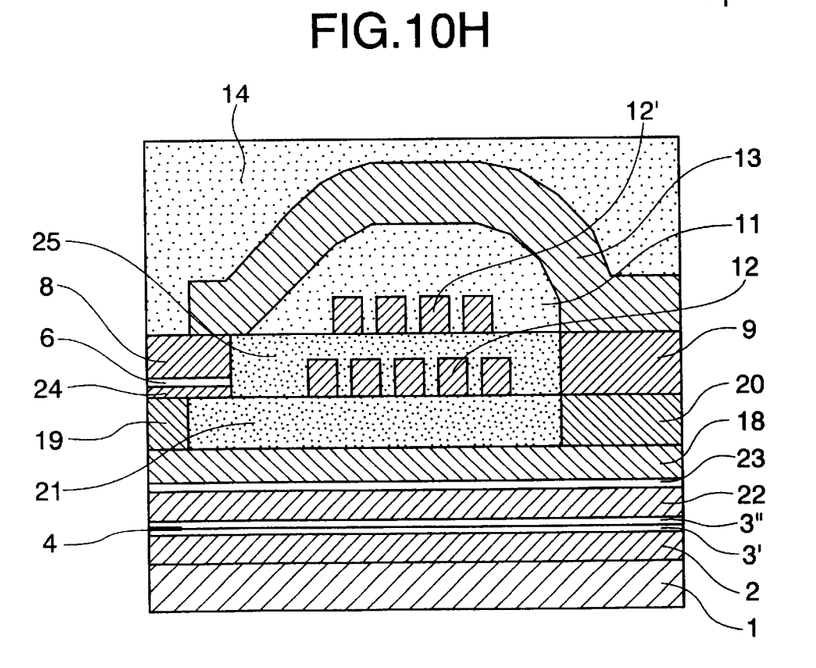

Next, the upper magnetic pole top layer 13 is formed by frame plating as shown in FIG. 10H. The upper magnetic pole layer 13 can use the 82NiFe film in the same way as the lower magnetic pole main layer 18, but the 45NiFe film having high saturation flux density and high specific resistance is preferably used because the drop of the recording magnetic field intensity is small even when the film thickness is decreased and the eddy current loss at a high frequency can be reduced.

Next, the protective layer 14 made of $Al_2O_3$ is formed on the upper magnetic pole top layer 13. Further, after each of the layers described above is formed, the substrate is sliced into a predetermined shape and the air bearing surface is polished to give a slider. A suspension for holding the slider is fitted and wiring is arranged for supplying recording and reading currents to give a thin film magnetic head.

As described above, the saturation flux density of the magnetic material used for the lower magnetic pole projection layer 24 and the upper magnetic pole front end layer 8 greatly affects the magnetic field intensity of the thin film magnetic head according to the invention. For this reason, the saturation magnetic flux density of the magnetic material used for the lower magnetic pole projection layer 24 and the upper magnetic pole front end layer 8 is preferably at least 1.6 T. Further preferably, the saturation magnetic flux density is at least 1.8 T.

On the other hand, the magnetic material used for the upper magnetic pole top layer 13 or the lower magnetic pole main layer 18 may well have lower saturation magnetic flux density than that of the magnetic material adjacent to the recording gap of the upper magnetic pole front end layer 8 or the lower magnetic pole projection layer 24, but its specific resistance is preferably higher to reduce the eddy current and to improve the high frequency recording characteristics. For example, the CoNiFe film used for the upper magnetic pole front end layer 8 and the lower magnetic pole front end layer 24 in the embodiment of the invention has specific resistance of 17 to 20 $\mu\Omega$cm, and the 45Ni—Fe film used for the upper magnetic pole top layer 13 and the lower magnetic pole main layer 18 has high specific resistance of 45 to 55 $\mu\Omega$cm. This high specific resistance is effective for reducing the eddy current of the upper magnetic pole top layer and the lower magnetic pole that have a large width and are easily susceptible to the influences of the eddy current effect, increasing the rise speed of the high frequency magnetic field and improving the high frequency recording characteristics. Therefore, the magnetic material used for the upper magnetic pole top layer or the lower magnetic pole preferably has specific resistance of at least 45 $\mu\Omega$cm.

The embodiment of the invention represents the example where the upper magnetic pole front end layer 8 is made as a whole of the CoNiFe film but the following construction can also be employed. The upper magnetic pole front end layer 8 is constituted by two or more layers and the layer adjacent to the recording gap layer is the CoNiFe film having high saturation magnetic flux density. The layer adjacent to the upper magnetic pole top layer 13 is the 46NiFe film having lower saturation magnetic flux density than the CoNiFe film but having higher corrosion resistance. According to this construction, the CoNiFe film that is easily corroded during grinding of the upper magnetic pole front end layer 8, the upper magnetic pole rear end layer 9 and the upper non-magnetic insulating layer 25 shown in FIG. 10F is not exposed to the grinding surface. In consequence, the occurrence of defects such as corrosion during the grinding process can be effectively prevented. In this case, the film thickness of the high saturation magnetic flux layer adjacent to the recording gap must be at least 0.5 $\mu$m to secure the recording magnetic field intensity.

Figure 11A:
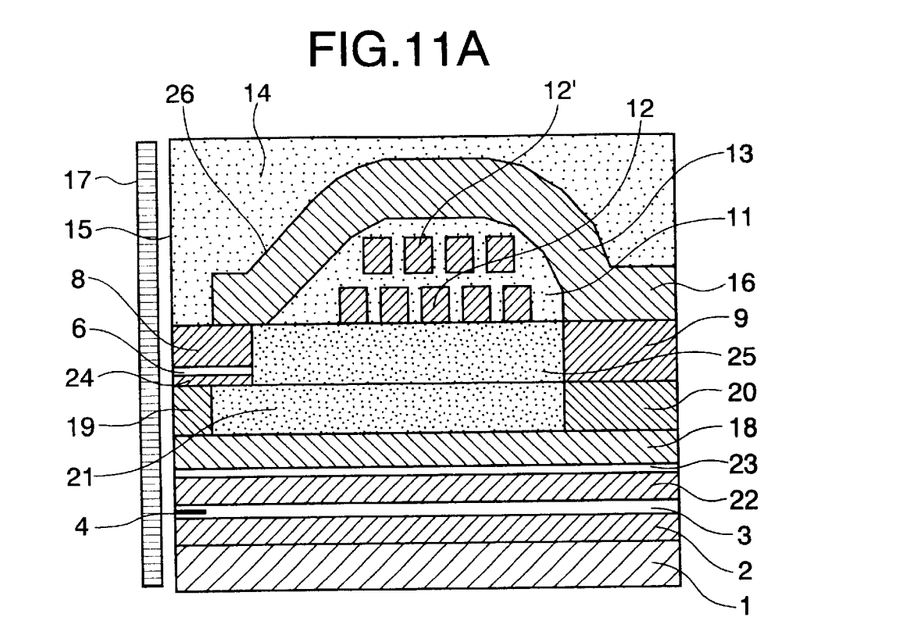
FIGS. 11A and 11B are sectional views showing a thin film magnetic head according to another embodiment of the invention.
Figure 11B:
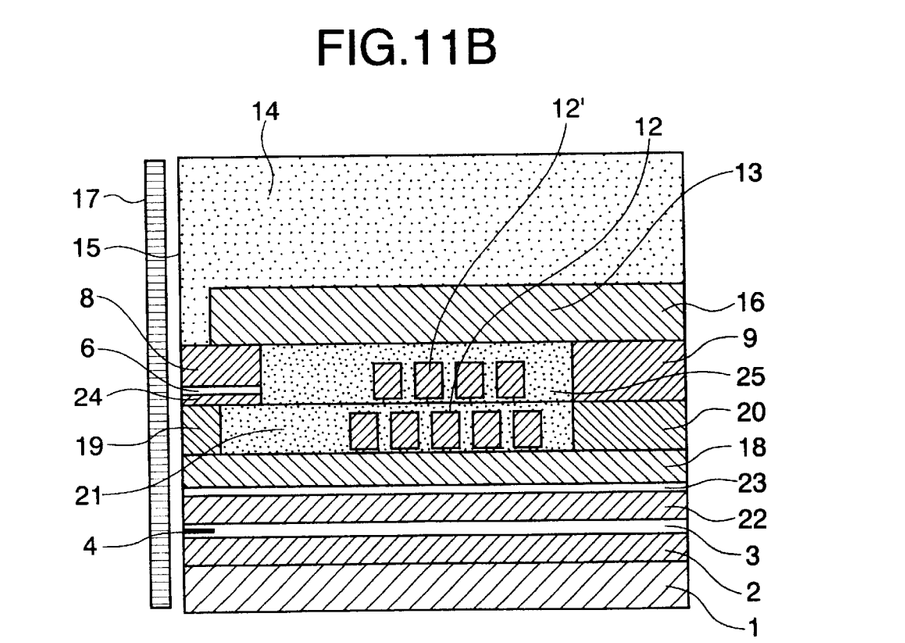

In the thin film magnetic head according to the invention, the lower coil 12 is interposed between the upper magnetic pole front end layer 8 and the upper magnetic pole rear end layer 9 and is so arranged as to encompass the upper magnetic pole rear end layer 9 as shown in FIG. 2 whereas the upper coil 12' is disposed in the coil insulating layer and is arranged as to encompass the rear end part 16 of the upper magnetic pole top layer. However, both lower and upper coils 12 and 12' may well be disposed inside the coil insulating layer 11 and may be so arranged as to encompass the rear end part 16 of the upper magnetic pole top layer as shown in FIG. 11A. Alternatively, it is possible to employ the construction in which the lower coil 12 is interposed between the lower magnetic pole front end portion 19 and the lower magnetic pole rear end layer 20 and is so arranged as to encompass the lower magnetic pole rear end layer 20 whereas the upper coil 12' is interposed between the upper magnetic pole front end layer 8 and the upper magnetic pole rear end layer 9 and is so arranged as to encompass the upper magnetic pole rear end layer 9 as shown in FIG. 11B. However, the construction shown in FIG. 2 can reduce the height of the upper magnetic pole top layer 13 much more than the construction shown in FIG. 11A because only the upper coil 12' needs be stored in the coil insulating layer 11. As a result, since the magnetic path length of the overall head can be reduced, the rise speed of the magnetic field at a high frequency can be increased and the recording characteristics at a high frequency can be improved. The construction shown in FIG. 11B has the feature in that the coil insulating layer 11 becomes unnecessary and the magnetic path length of the overall head can be further reduced. Though the coil has two layers, i.e., the upper and lower layers, in the embodiment described above, the same effect of the invention can be acquired when the coil has a single layer or 4 or more layers.

The effect of improving track width accuracy and the effect of improving the magnetic field intensity in the thin film magnetic head according to the invention can be acquired at any track width. However, these effects become remarkable particularly in a narrow track width range where the track width is 0.4 mm or below and in a range where the drops of the magnetic field intensity and track width accuracy become a great problem. These effects are also remarkable when the thin film magnetic head of the invention is assembled in a magnetic disk apparatus using a high coercive force medium having coercivity of 279 KA/m (35,000 e). The excellent effects can further be obtained in a magnetic disk array apparatus having built-in magnetic disk apparatuses using the thin film magnetic head according to the invention.

A head having a track width center value of 0.35 $\mu$m is produced and variance of the track width is measured in order to compare processing accuracy of the recording track width of the thin film magnetic head according to the invention with that of the thin film magnetic head of the prior art shown in FIG. 3 and with the thin film magnetic head using the lower magnetic pole front end layer shown in FIG. 4. Table 1 tabulates the result.

TABLE 1

| Head structure | Track width variance 3$\sigma$ |
| --- | --- |
| Structure of invention | 23 nm |
| prior art structure (FIG. 3) | 66 nm |
| Structure having lower magnetic pole front end layer (FIG. 4) | 40 nm |

As tabulated in Table 1, the structure of FIG. 4 in which the lower magnetic pole front end layer 19 is disposed and the resist frame for forming the upper magnetic pole front end layer 8 deciding the track width is formed on the planar surface can reduce track width variance. When the lower magnetic pole front end layer and the lower magnetic pole projection layer are further disposed as in the invention, the resist frame for forming the upper magnetic pole front end layer 8 deciding the track width can be formed on the planar surface. When the lower magnetic pole projection layer 24 is further disposed, the projection part of the lower magnetic pole can be formed without conducting trimming such as ion trimming. Consequently, track width variance can be drastically reduced and high precision track width can be achieved.

As described above, in the embodiment of the invention, the lower magnetic pole front end layer is arranged on the lower magnetic pole main layer, and the lower magnetic pole projection layer, the recording gap layer and the upper magnetic pole front end layer that have substantially the same planar shape are further arranged on the lower magnetic pole front end layer. Therefore, the embodiment can provide a thin film magnetic head having high track width accuracy and a high recording magnetic field intensity and a production method the head. A magnetic disk apparatus and a magnetic disk array apparatus each having mounted thereto the thin film magnetic head of the embodiment of the invention can achieve excellent magnetic disk apparatus and magnetic disk array apparatuses exhibiting excellent performance when combined with a medium having coercivity of 279 kA/m (35,000 3) or more.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A thin film magnetic head including, in combination, a reading part having a magnetic shield layer and a reading element formed on a substrate and a recording part having a lower magnetic pole, an upper magnetic pole, a coil and a non-magnetic insulating layer, wherein:

said lower magnetic pole includes at least a lower magnetic pole main layer, a lower magnetic pole front end layer and a lower magnetic pole projection layer;

said upper magnetic pole includes at least an upper magnetic pole front end layer and an upper magnetic pole top layer;

said coil is interposed between said upper magnetic pole top layer and said lower magnetic pole main layer;

said non-magnetic insulating layer fills gaps among said coil, said upper magnetic pole top layer and said lower magnetic pole main layer;

said lower magnetic pole front end layer magnetically couples with a front end part of said lower magnetic pole main layer;

said lower magnetic pole projection layer and said upper magnetic pole front end layer having substantially the same planar shape and defining a track width on an air bearing surface are laminated through a recording gap layer on a plane constituted by said lower magnetic pole front end layer and a lower non-magnetic insulating layer;

a front end part of said upper magnetic pole top layer magnetically couples with said upper magnetic pole front end layer; and a width of said lower magnetic pole front end layer in a track width direction is greater than the track width, and a length of said lower magnetic pole projection layer and said upper magnetic pole front end layer from the air bearing surface is greater than a length of said lower magnetic pole front end layer from the air bearing surface.

2. A thin film magnetic head according to claim 1, wherein said lower magnetic pole includes said lower magnetic pole rear end layer, said upper magnetic pole includes said upper magnetic pole rear end layer, and a rear end portion of said lower magnetic pole main layer, said lower magnetic pole rear end layer, said upper magnetic pole rear end layer and the rear end portion of said upper magnetic pole top layer are magnetically coupled with one another.

3. A thin film magnetic head according to claim 1, wherein a thickness of said lower magnetic pole projection layer is smaller than a thickness of said upper magnetic pole front end layer.

4. A thin film magnetic head according to claim 3, wherein a thickness of said lower magnetic pole projection layer is from 0.05 $\mu$m to 0.35 $\mu$m.

5. A thin film magnetic head according to claim 1, wherein said lower magnetic pole projection layer and said upper magnetic pole front end layer have a width corresponding to a track width from the air bearing surface to a magnetic pole expansion position, and said width increases from the magnetic pole expansion position towards a rear portion of said head.

6. A thin film magnetic head according to claim 1, wherein said upper magnetic pole front end layer is constituted by a plurality of magnetic layers each having different saturation magnetic flux density, and said magnetic layers on the side of the recording gap have higher saturation magnetic density than said magnetic layers on a remote side from the recording gap.

7. A thin film magnetic head according to claim 1, wherein saturation magnetic flux density of at least a part of a magnetic material used for said upper magnetic pole front end layer or said lower magnetic pole projection layer is higher than saturation magnetic flux density of a magnetic material used for said lower magnetic pole main layer or said upper magnetic pole top layer.

8. A thin film magnetic head according to claim 1, wherein specific resistance of a magnetic material used for said upper magnetic pole main layer or said upper magnetic pole top layer is higher than specific resistance of a magnetic material used for at least of a part of said upper magnetic pole front end layer or said lower magnetic pole projection layer.

9. A thin film magnetic head according to claim 1, wherein saturation magnetic flux density of a magnetic material used for said lower magnetic pole projection layer is higher than saturation magnetic flux density of a magnetic material used for said lower magnetic pole front end layer.

10. A thin film magnetic head according to claim 1, wherein specific resistance of a magnetic material used for said lower magnetic pole rear end layer or said upper magnetic pole rear end layer is higher than specific resistance of a magnetic material used for at least a part of said lower magnetic pole projection layer or said upper magnetic pole front end layer.

11. A thin film magnetic head according to claim 1, wherein said recording gap layer comprises a non-magnetic metal layer or a weak magnetic metal layer having saturation flux density of 0.02 T or below.

* * * * *